(12) United States Patent
Yu

(10) Patent No.: US 7,397,600 B2
(45) Date of Patent: Jul. 8, 2008

(54) LASER PULSE MULTIPLIER

(75) Inventor: David U. L. Yu, Rancho Palos Verdes, CA (US)

(73) Assignee: DULY Research Inc., Rancho Palos Verdes, CA (US)

( * ) Notice: Subject to any disclaimer, the term of this patent is extended or adjusted under 35 U.S.C. 154(b) by 72 days.

(21) Appl. No.: 11/199,628

(22) Filed: Aug. 9, 2005

(65) Prior Publication Data

US 2007/0047601 A1    Mar. 1, 2007

(51) Int. Cl.
*H04B 10/12* (2006.01)
(52) U.S. Cl. .................... 359/341.1; 359/336
(58) Field of Classification Search .......... 359/333–349
See application file for complete search history.

(56) References Cited

U.S. PATENT DOCUMENTS

| 4,190,811 | A | * | 2/1980 | Alcock et al. | 359/299 |
| 5,030,909 | A | * | 7/1991 | Blancha et al. | 324/752 |
| 5,572,358 | A | * | 11/1996 | Gabl et al. | 359/347 |
| 6,122,097 | A | * | 9/2000 | Weston et al. | 359/345 |
| 6,483,629 | B1 | * | 11/2002 | Boffi et al. | 359/336 |

\* cited by examiner

*Primary Examiner*—Minsun Harvey
*Assistant Examiner*—Xinning(Tom) Niu

(57) ABSTRACT

A device for generating a plurality of laser pulses from a recirculating single laser pulse in an optical delay line that is capable of partially transmitting the trapped pulse out of the delay line. The energy of the partially reflected trapped pulse is restored before beginning another round trip in the delay line. The time structure of an output pulse train thus generated by the device comprises a sequence of macro pulses, each comprising a plurality of micro pulses.

2 Claims, 3 Drawing Sheets

LASER PULSE MULTIPLIER

BACKGROUND OF THE INVENTION

1. Field of the Invention

The present invention is related to the production of a laser pulse train. More specifically, the present invention provides a device that generates a plurality of laser pulses from a single laser pulse using an array of optical elements.

2. Description of Prior Art

For many applications, a high-yield electron source with excellent beam quality is needed. For example, short pulse, nearly mono-energetic, tunable x-rays may be generated by the collision of a plurality of electron bunches from a photo-injector with synchronized photon pulses in a high-power laser beam via Compton backscattering. Such x-rays have uses in medical imaging, crystallography, and designer drugs, to name a few. In addition to x-ray generation via Compton scattering, the laser pulses may be used directly or in another manner as described above in other applications such as in optical communications. Another use of a laser-triggered photoinjector is in the generation of a train of multi-bunch electrons for acceleration in linear electron-positron colliders such as the International Linear Collider or the CERN Linear Collider.

Conventional multi-cell photoinjectors are capable of accelerating short electron bunches to energies in the range of 3-30 MeV utilizing the rf pulse from a high power source with peak power typically tens of megawatts. The electron bunches are generated by laser pulses synchronous with the rf pulses. The synchronization is normally controlled by a master clock which drives both the high power rf source and the laser. Thus during each rf pulse, one electron bunch is generated and accelerated in the photoinjector. Because of the great disparity between the length of the rf pulse and that of the laser (and consequently electron) pulse, this is a very inefficient way to utilize the energy of the rf pulse. Thus in the conventional single-bunch scheme, only a single rf cycle out of thousands of cycles in an rf pulse is utilized for acceleration, even though the rf pulse length is usually much longer than the filling time of the accelerating cavities.

In principle, a train of many electron micro bunches can be accelerated synchronously in individual rf cycles within a single macro rf pulse, provided that the beam loading on the rf pulse is not severe. Such a multi-bunch acceleration scheme may require a very high rep rate laser. The repetition rate of a laser beam is inversely related to its peak power. Current technology limits the maximum rep rate of a laser with a milliwatt level of peak power to a few kilohertz, which is insufficient for the purpose of generating electron bunches typically a few nanoseconds apart for multibunch acceleration. Furthermore, even if the laser rep rate can be increased to a few hundred megahertz as required, only several thousands of these pulses would be needed during each macro rf pulse, and therefore all other laser pulses between macro rf pulses are unnecessarily wasted.

An example of a prior art approach is current work being carried out at the Rutherford Laboratory where multiple laser pulses are generated with a low-power, continuous wave (CW) laser and selected pulses are then amplified to high power using an array of pulsed amplifiers. For photoinjector application, the duration and rep rate of the amplified pulses are dictated by those of the high power rf source. Thus only the laser pulses that fall within the time structure of the pulsed amplifiers gain energy, and the rest of the CW laser pulses are discarded.

What is thus desired is to provide a multiple laser pulse train having a predetermined macro and micro time structure with an efficient device not using a CW laser.

SUMMARY OF THE INVENTION

It is a general object of the present invention to provide a device for generating a plurality of laser pulses from a single stored laser pulse. Another object of the present invention is to store a single, short laser pulse in a recirculating delay line, or a path, comprising an array of optical elements by which the pulse may travel within the apparatus. During each round trip a portion of the stored laser pulse is allowed to leave the apparatus to form an output pulse, while the remaining portion of the pulse is restored to its first condition and continues to recirculate inside the apparatus. The stored pulse is ejected from the apparatus after a specified number of round trips N to form a micro time structure for the output pulses. A single laser pulse is injected into the apparatus at a repetition rate n to form the macro time structure of the output pulses.

Electron bunches in a photoinjector are formed by the illumination of laser pulses on a photocathode. The time structure of the electron bunches is determined by the time structure of the laser pulses. Electron bunches in a dc accelerator gain energy after being accelerated by an applied voltage. Electron bunches in an rf linear accelerator gain energy after being accelerated in a time-varying axial electric field, which is phase synchronized to the velocity of the electrons. The electric field in the accelerating cells of an rf photoinjector is energized by a high peak power rf source such as a klystron, which has a relatively long pulse (microsecond) compared with the electron bunch length (picosecond). A single electron bunch (or multiple electron bunches) may be accelerated in individual rf cycle(s) of a klystron output pulse. In the case of multiple electron bunch acceleration, the spacing between the bunches is equal to an integral multiple of the rf wavelength of the power source. The repetition rate of the long rf power pulses is typically one to a few hundred Hertz.

For photoinjector application, increasing the number of laser pulses that illuminate a photocathode in an electron photoinjector produces a plurality of electron bunches and improves the electron production rate in the photoinjector. The present invention increases the number of electron bunches up to several thousand-fold compared with a single bunch photoinjector.

The device of the present invention does not require a CW laser. Instead the device employs a conventional, low rep-rate, low to moderate power laser as the "seed" laser and creates from each seed laser pulse a train of identical laser pulses. For photoinjector application, the rep rate of the high power rf source which drives the electron bunches is an integral multiple of the rep rate of the seed laser. The number of micro laser pulses and the inter-spacing between micro pulses can be suitably chosen to create the desired train of multi-bunch electrons.

An optical delay line first traps a single laser pulse using a polarization sensitive beam splitter and a first Pockels cell and then recirculates the pulse using an array of optical elements, which consist of at least one mirror and one additional polarization sensitive beam splitter. Standard optical elements employed in the present device are readily available commercially. The combination of optical elements and the use and operation thereof in the manner as specifically prescribed in the present invention, however, serve the stated purpose of the device. The energy of the recirculating pulse is replenished using a diode pumped amplifier rod located in the delay line, after a portion of the recirculating laser pulse is split off during each round trip into an outgoing laser pulse via the second beam splitter. The amplifier is energized by a dc or pulsed voltage, which remains "on" during the life of the trapped single pulse in the delay line. A regenerative chirped pulse amplifier may also be used instead of an amplifier rod. It preserves the pulse shape better at high intensity at the expense of increased system complexity. The number of round trips completed by the recirculating laser pulse determines the number of micro laser pulses generated. The length of the optical delay line in each round trip determines the spacing between the generated micro pulses. The energy of the generated laser micro pulse is determined by the energy of the recirculating laser pulse, the transmission efficiency of the output beam splitter, and the amplifier power. The amplifier is used to replenish the energy lost by the recirculating pulse during each round trip in the delay line as well as during the generation of each micro pulse. After a desired number of pulses have been generated by the pulse multiplier, generation of a train of micro laser pulses is terminated when the recirculating single laser pulse is ejected from the optical delay line. A second Pockels cell placed between the amplifier and the first beam splitter is turned on during the last round trip of the recirculating pulse in order to rotate the polarization of the recirculating pulse and allow it to be ejected through the first beam splitter. Alternatively, the amplifier may be turned off after a prescribed number of round trips of the recirculating pulse so that without energy replenishment, the pulse naturally decays thereafter. A train of laser pulses thus generated may be further amplified and directed to a photocathode to create an electron beam having the same time structure as the laser beam. Since ultraviolet light is usually required for the generation of photoelectrons from a photocathode, the laser frequency of the micro laser pulse train may be optionally doubled, tripled or quadrupled after the laser pulse train is generated from the device in the present invention and prior to its impingement on the photocathode. A train of laser pulses generated by this device may also be further manipulated to change the shape and duration of each pulse as well as the inter-spacing between pulses as required by specific applications.

DESCRIPTION OF THE DRAWINGS

For a better understanding of the present invention and further features thereof, reference is made to the following descriptions which are to be read in conjunction with the accompanying drawings wherein.

DESCRIPTION OF THE INVENTION

Figure 1A:
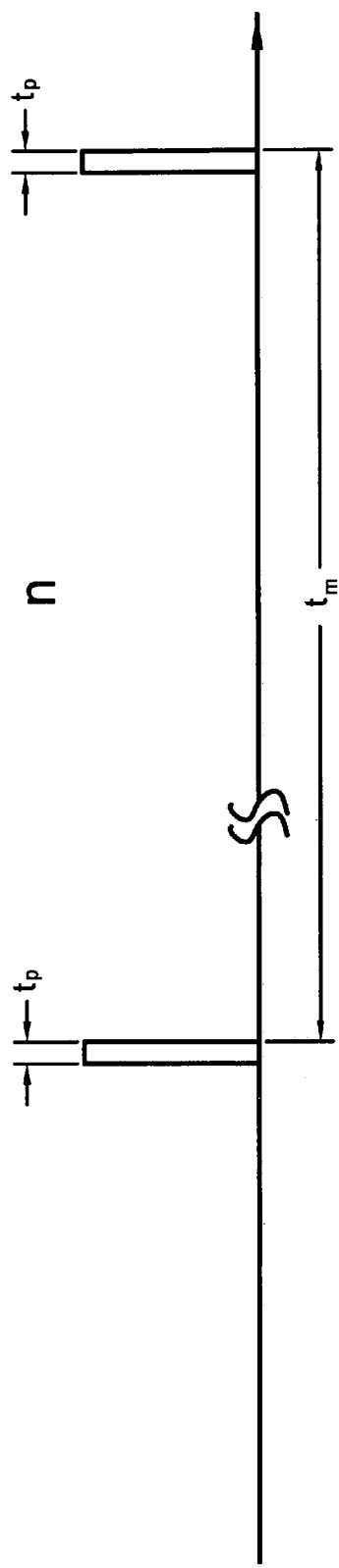
FIGS. 1A and 1B are schematic diagrams of the time structures of "seed" laser pulses and generated laser pulses, respectively.
Figure 1B:
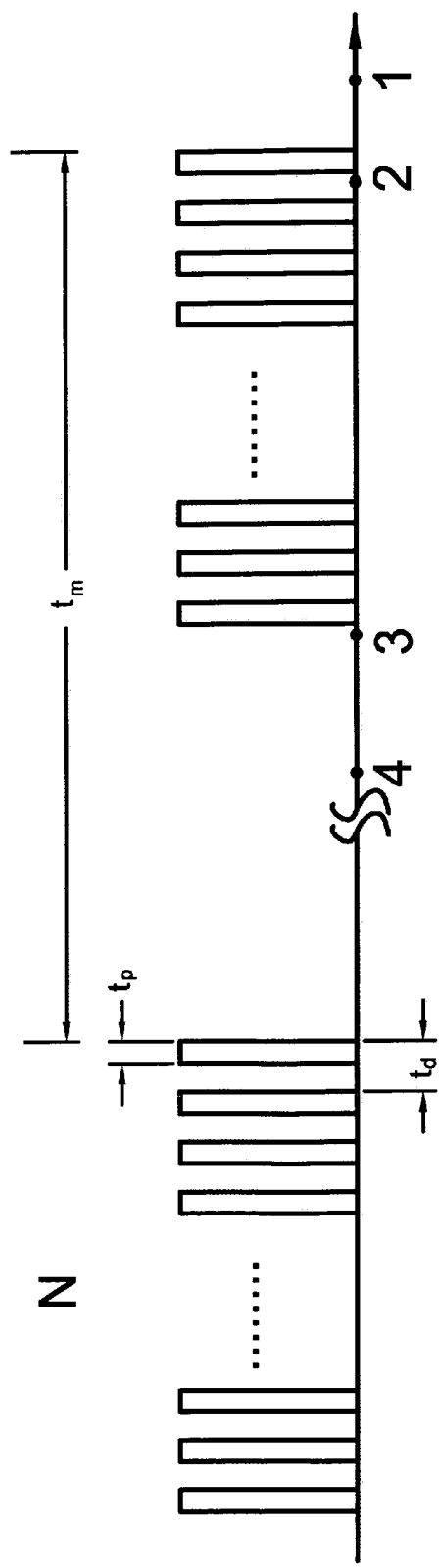

The time structure of the laser pulses produced by the device in the present invention is illustrated by the following example as shown in FIGS. 1A and 1B. FIG. 1A is a schematic representation of the incoming macro pulse train, comprising a plurality of single pulses with a repetition rate of n times per second, each with a finite duration $t_p$, versus time along the initial beam path at a location just before the first incoming pulse enters the pulse multiplier (PM) 1 of the present invention shown in FIGS. 2 and 3. The time separation between any two adjacent pulses is $t_m (=1/n)$ seconds.

FIG. 1B is a schematic representation of the output micro pulse trains along the final beam path at a location just after the pulses leave the PM 1. In this scheme, a train of N output micro laser pulses, with each pulse length $t_p$ seconds long and separated by $t_d$ seconds from its nearest pulse, has the same repetition rate of n times per second as the incoming macro pulse train. If this train of laser pulses after proper preparation impinges upon the cathode in a photoinjector, the electron bunches thus generated also follow the same temporal profile. With a proper inter-pulse spacing, the electron bunches ride in the same phase ($\pm 2n\pi$) of N rf cycles, all within a single macro rf pulse. The next macro rf pulse likewise accelerates another set of N electron bunches.

Figure 2:
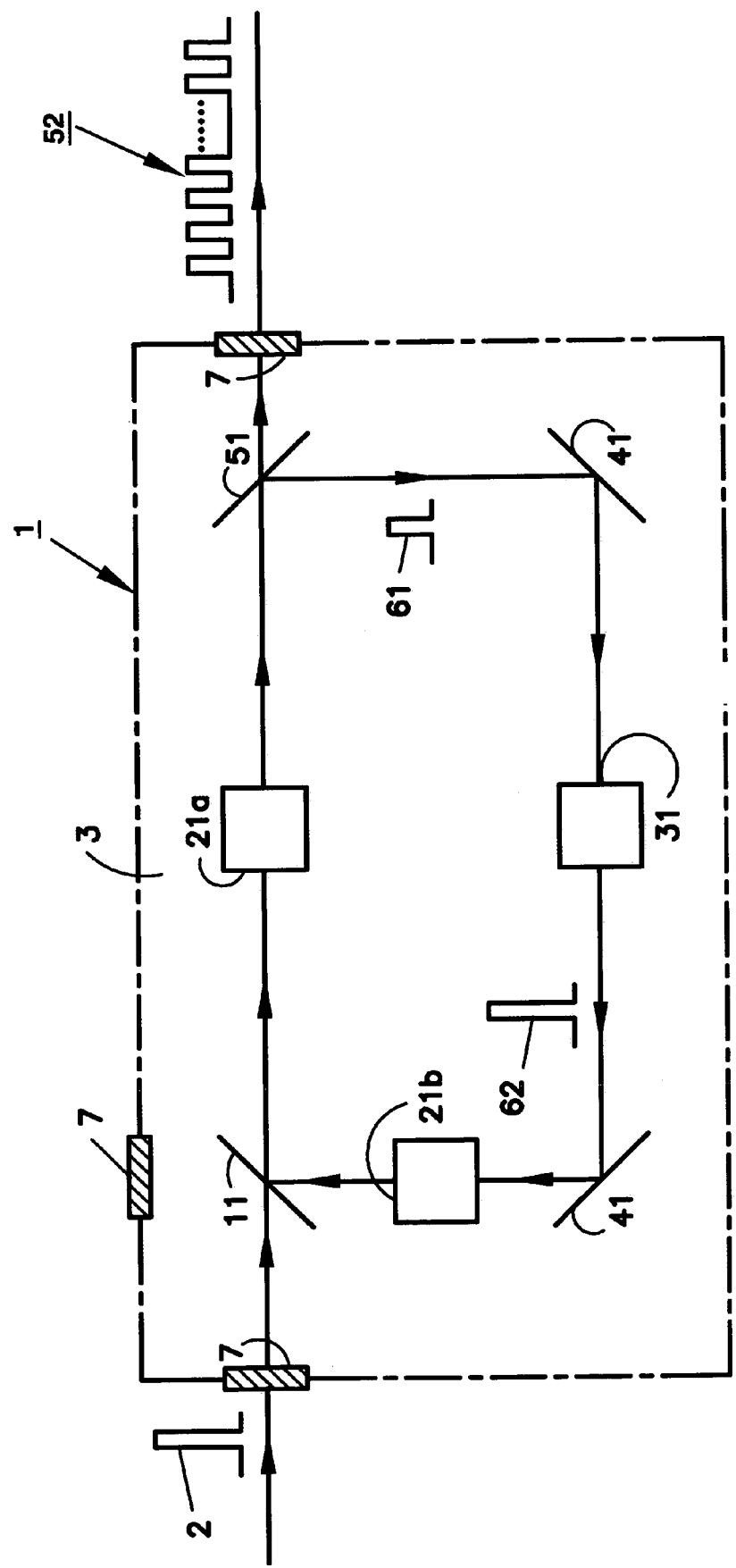
FIG. 2 is a schematic diagram of the main embodiment of the laser pulse multiplier of the present invention.

A device to generate a multibunch laser train in accordance with the teachings of the present invention is illustrated in FIG. 2.

In particular, a train of micro laser pulses is generated from a single laser pulse 2 with PM 1 which includes an optical delay line as shown comprising an incoming beam splitter 11, a first Pockels cell 21a, a second Pockels cell 21b, an amplifier 31, mirrors 41 and an output beam splitter 51. The single laser pulse 2 may be one of a plurality of identical laser pulses of finite duration. In one embodiment of the present invention, PM 1 has a vacuum chamber 3 to house the optical elements in order to preserve the properties of recirculating laser pulse 62 in the delay line by avoiding its collision with air. The laser pulse 2, 52 enters and exits vacuum chamber 3 via a vacuum tight window 7. In lieu of vacuum chamber 3, all optical elements in the delay line are placed in a HEPA-filtered, dust-free chamber to avoid collision between laser pulse 61, 62 with air-borne dust particles. In the absence of vacuum chamber 3 laser pulse 2, 52 enters and exits PM 1 without window 7. For a recirculating laser pulse 61, 62 with low intensity and power density, vacuum chamber 3 is optional. In any event, the intensity and power density of recirculating laser pulse 62 should not be excessively high so that pulse shape is not distorted by any nonlinear, self modulating effects.

A single, incoming, P-polarized laser pulse of finite duration enters the delay line of PM 1 via a high-reflection, high-transmission beam splitter 11 located in one corner of the delay line. The first Pockels cell 21a, located in the delay line between first beam splitter 11 and the next component of the delay line, is initially energized. It rotates the polarization of the incoming laser pulse by ninety degrees and is turned off immediately after the pulse passes through it for the first time. The S-polarized laser pulse from Pockels cell 21a is reflected by mirrors 41 in PM 1, each located in the delay line and angled so as to guide the pulse toward the next component of the delay line. The output beam splitter 51, located within PM 1 serves the dual purposes of partially transmitting the trapped pulse out of PM 1, and reflecting the remainder of the pulse for recirculation in the delay line. Beam splitter 51 is oriented to allow partial transmission of S-polarized pulse to be a micro pulse in output pulse train 52. The transmitted pulse becomes one of the micro pulses in output pulse train 52 after exiting through the output beam splitter 51 of PM 1. Amplifier 31 is placed within the delay line to boost the energy of recirculating laser pulse 61. It is located in the delay line such that during each round trip, recirculating pulse 61 reaches amplifier 31 only after it has been partially reflected and transmitted through second, or output, beam splitter 51. The energy supplied by amplifier 31 is equal to the sum of the energy losses of recirculating laser pulse 62, first as a result of the partial transmission of the pulse from PM 1, and second as result of the finite Q of the optical cavity due to other losses at the mirrors, beam splitters, Pockels cells, etc. After amplification, S-polarized, recirculating pulse 62 again meets first beam splitter 11, which now allows total reflection, thus completing a round trip in the delay line. During the next and subsequent round trips, since first Pockels cell 21a has already been turned off, the pulse passes through it without a change in polarization. The required macro and micro time structures of output pulse train 52 is defined by the inter spacing between adjacent pulses and the length of the macro pulse. The inter spacing between adjacent pulses, $t_d$, is determined by the total length of the laser pulse optical path in the delay line inside the PM 1. In free space, the length of the delay line is approximately equal to the speed of light in vacuum times the spacing between pulses, $t_d$. The pulse however slows down when it travels through Pockels cells 21a and 21b, and amplifier 31. The number of micro pulses in each output pulse train 52 generated by each recirculating pulse, or N, is determined by the means with which the pulse train is terminated. There are two preferred means to terminate the outgoing pulse train. First, a second Pockels cell 21b, located between amplifier 31 and first beam splitter 11, is turned on after the desired number of pulses N has left PM 1, thus rotating the laser polarization of recirculating pulse 61 one more time and allow this singular pulse 62 with P-polarization to be ejected through first beam splitter 11. This means of terminating the outgoing pulse train is abrupt and all pulses in the train can be made nearly identical. The second means to terminate the outgoing pulse train is by turning off amplifier 31. By not replenishing the energy loss of the recirculating laser pulse 61, the pulse naturally decays in a number of round trips. The second means of the termination results in a pulse train that consists of a number of nearly identical laser pulses followed by several pulses of diminishing amplitudes. The macro pulse spacing, $t_m$, or the spacing of the leading micro pulses in any two successive groups of micro pulses (FIG. 1) is determined by the rep rate n ($=1/t_m$) of incoming laser pulse 2. Repeating the steps described above, the next incoming laser pulse generates another macro pulse of micro pulses at beam splitter 51 at the output of PM 1. Thus by repeating these steps, a train of macro pulses comprising micro pulses is formed. When the incident laser pulse is switched off, the macro pulse train is terminated.

A macro laser pulse train with a low rep rate n (typically 1-100 Hz) is initially generated by conventional means. An example of the seed laser is a commercially available Ti-Sapphire laser comprising a low rep rate oscillator and a chirped pulse amplification (CPA) system.

The timing of first Pockels cell 21a and second Pockels cell 21b is controlled by an external timing device which turns "on" or "off" a voltage applied to the Pockels cell. First Pockels cell 21a is "on" prior to the entrance of the single pulse 2 into PM 1 (time point 1 in FIG. 1B), and is turned "off" immediately after the first time recirculating pulse 61 passes through it (time point 2 in FIG. 1B) and remains "off" for the remainder life of recirculating single pulse 61, 62 in the delay line. The second Pockels cell 21b is "off" prior to the entrance of incoming single pulse 2 into PM 1 (time point 1 in FIG. 1B) and remains "off" at all time during the life of recirculating pulse 61, 62 until the last micro pulse in output pulse train 52 has been generated (time point 3 in FIG. 1B). Prior to the arrival of recirculating pulse 62 at second Pockels cell 21b during its last round trip, second Pockels cell 21b is turned "on" to eject the pulse from PM 1, and thereafter turned "off" prior to the entry of the another incoming single pulse 2 (time point 4 in FIG. 1B).

The mirror, beam splitter and window holders are optionally water-cooled in order to minimize thermal distortions of the optical elements. The linear and angular positions of the mirrors and beam splitters mounted along the optical delay line should be precisely controlled. Optical elements are attached to mounts on motorized tracks on an optical table or a stable platform. Accurate mechanical control of the translation and rotation of the mirrors and beam splitters for the purpose of alignment and adjustment of their positions and orientations can be accomplished using conventional servos with a remote controlled feedback circuit. Conventional spatial and temporal diagnostics for laser pulses may be applied on incoming pulse 2, ejected pulse 62 and generated pulse train 52 to control the feedback circuit.

Figure 3:
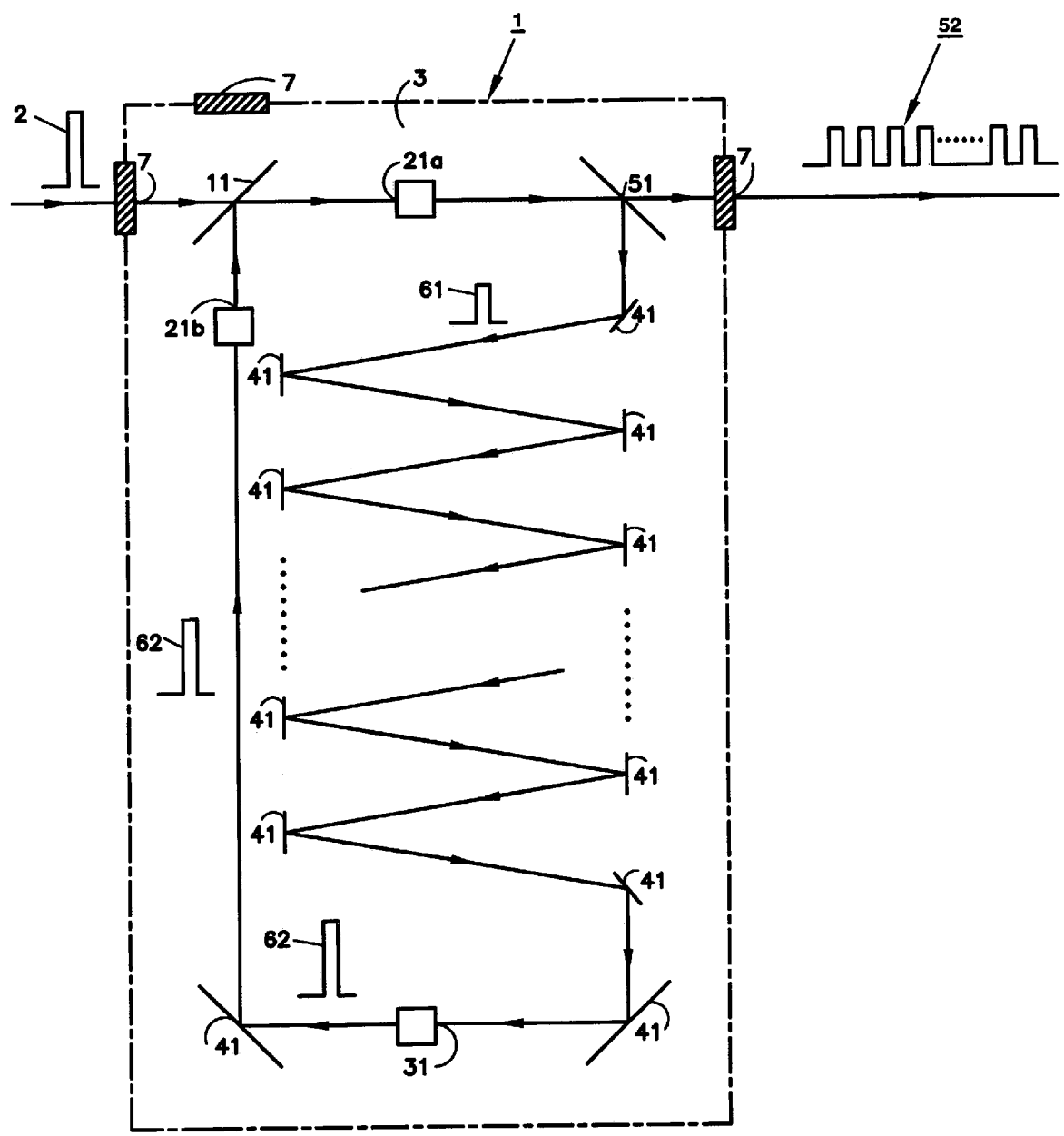
FIG. 3 is a schematic diagram of the second embodiment of the laser pulse multiplier of the present invention.

A drawback of the pulse multiplier shown in FIG. 1 is that when the required inter spacing between pulses, $t_d$, is long (>100 ns), the length of the delay line becomes large. An alternative PM design is shown in FIG. 3. A plurality of mirrors 41 is added in PM 1 to fold the delay line into a smaller footprint, as recirculating laser pulse 61 is reflected between mirrors 41. The number of mirrors 41 as well as the distances between mirrors 41, and between mirror 41 and beam splitters, are chosen so that the each round trip time of recirculating laser pulse 61, 62 in the delay line, including any delay in Pockels cells 21a and 21b and amplifier 31, is equal to the desired spacing $t_d$ between two successive micro pulses in output pulse train 52. The arrangement of multiple mirrors 41 in FIG. 3 is shown for illustration only. Other mirror arrangements can be easily made following the teaching of this embodiment.

The laser pulse multiplier 1 of the present invention thus provides a way to generate a prescribed time structure of a train of laser pulses comprising a macro pulse train of micro pulses, each micro pulse train being formed from a single laser pulse.

Many variations of the present invention are possible. For example, there is flexibility in the number of components in the delay line as well as the way in which they are positioned and ordered. The properties of each micro laser pulse (e.g. pulse length, power, wavelength) in the macro laser pulse train generated may be further modified by other means such as a pulse stretcher or compressor to change the pulse length, and amplifier(s) to boost the power. Frequency doubling, tripling, or quadrupling crystals may be used to change the wavelength.

What is claimed is:

1. A pulse multiplier in which plurality of plane-polarized laser pulses of finite durations is generated from a single incoming plane-polarized laser pulse in a partially transmitting delay line comprising: means for providing entry of said incoming plane polarized pulse into said delay line; means for providing recirculation of said plane polarized pulse in said delay line in a plurality of round trips; means for partially transmitting said recirculating plane polarized pulse in said delay line during each round trip, and forming a plurality of outgoing plane polarized pulses during a predetermined number of round trips of said single pulse in said delay line; means for replenishing the energy lost by said recirculating pulse during each round trip; means for ejecting said recirculating plane polarized pulse from said delay line after a desired number of outgoing plane polarized pulses are produced from said pulse multiplier; and a first Pockels cell, having means for attachment within the delay line, rotates the polarization of said incoming pulse immediately after its first entry through said first beam splitter; said first Pockels cell being energized prior to the first entry of said pulse there through and rotates the polarization vector of said pulse by ninety degrees, and is turned off after passage of said pulse there through, thereby trapping said pulse in an optical delay line.

2. A pulse multiplier in which plurality of plane-polarized laser pulses of finite durations is generated from a single incoming plane-polarized laser pulse in a partially transmitting delay line comprising: means for providing entry of said incoming plane polarized pulse into said delay line; means for providing recirculation of said plane polarized pulse in said delay line in a plurality of round trips; means for partially transmitting said recirculating plane polarized pulse in said delay line during each round trip, and forming a plurality of outgoing plane polarized pulses during a predetermined number of round trips of said single pulse in said delay line; means for replenishing the energy lost by said recirculating pulse during each round trip; means for ejecting said recirculating plane polarized pulse from said delay line after a desired number of outgoing plane polarized pulses are produced from said pulse multiplier; and a first Pockels cell, having means for attachment within the delay line, rotates the polarization of said incoming pulse immediately after its first entry through said first beam splitter; said first Pockels cell being energized prior to the first entry of said pulse there through and rotates the polarization vector of said pulse by ninety degrees, and is turned off after passage of said pulse there through, thereby trapping said pulse in an optical delay line, a second Pockels cell position between said second beam splitter and said first beam splitter, said second Pockels cell being energized during the last round trip of said recirculating plane polarized pulse and again rotating the polarization vector of said recirculating pulse and allowing the pulse to transmit through said first beam splitter after a desired number of pulses have been generated by said pulse multiplier; said second Pockels cell being turned off after the polarization of said recirculating pulse is changed.

* * * * *